(12) United States Patent  
Cho

(10) Patent No.: US 11,092,062 B2  
(45) Date of Patent: Aug. 17, 2021

(54) BELLOWS HAVING TWEEZERS-SHAPED CORRUGATED PORTIONS AND METHOD FOR MANUFACTURING SAME

(71) Applicant: UNION CO., LTD., Cheonan-si (KR)

(72) Inventor: Kyung Sang Cho, Pyeongtaek-si (KR)

(73) Assignee: UNION CO., LTD., Cheonan-si (KR)

( * ) Notice: Subject to any disclaimer, the term of this patent is extended or adjusted under 35 U.S.C. 154(b) by 328 days.

(21) Appl. No.: 16/079,734

(22) PCT Filed: Feb. 8, 2017

(86) PCT No.: PCT/KR2017/001366  
§ 371 (c)(1),  
(2) Date: Aug. 24, 2018

(87) PCT Pub. No.: WO2017/146399  
PCT Pub. Date: Aug. 31, 2017

(65) Prior Publication Data  
US 2019/0048780 A1   Feb. 14, 2019

(30) Foreign Application Priority Data  
Feb. 25, 2016 (KR) .................. 10-2016-0022764

(51) Int. Cl.  
*F16L 9/06* (2006.01)  
*F16L 51/02* (2006.01)  
(Continued)

(52) U.S. Cl.  
CPC ......... *F01N 13/1816* (2013.01); *B21D 15/03* (2013.01); *B21D 26/033* (2013.01);  
(Continued)

(58) Field of Classification Search  
CPC . F16L 9/06; F16L 51/02; F16L 51/022; F16L 25/0036; F16L 27/0857;  
(Continued)

(56) References Cited

U.S. PATENT DOCUMENTS 2,433,416 A * 12/1947 Baumann .................. 285/299  
2,444,008 A *  6/1948 Fentress  
(Continued)

FOREIGN PATENT DOCUMENTS

DE  10-2011-001279 A1  9/2012  
EP  1199116 A2  4/2002  
(Continued)

*Primary Examiner* — Matthew Troutman  
*Assistant Examiner* — William S. Choi  
(74) *Attorney, Agent, or Firm* — Novick, Kim & Lee, PLLC; Jae Youn Kim

(57) ABSTRACT

A bellows having tweezers-shaped corrugated portions for increasing resistance and restoring force against torsion includes: a first flat part having a flat cylindrical shape; a second flat part having a flat cylindrical shape and disposed opposite to the first flat part; and a plurality of corrugated portions, each having a tweezers shape and disposed between the first flat part and the second flat part, wherein each of the plurality of corrugated portions is sequentially connected to each other, so as to increase resistance and restoring force against torsion.

5 Claims, 7 Drawing Sheets

(51) Int. Cl.
  *F01N 13/18* (2010.01)
  *B21D 26/047* (2011.01)
  *B21D 26/033* (2011.01)
  *B21D 15/03* (2006.01)

(52) U.S. Cl.
  CPC ........... *B21D 26/047* (2013.01); *F01N 13/18* (2013.01); *F16L 9/06* (2013.01); *F16L 51/02* (2013.01); *F16L 51/022* (2013.01); *F01N 2450/20* (2013.01); *F01N 2470/06* (2013.01); *F01N 2470/12* (2013.01)

(58) Field of Classification Search
  CPC .......... F16L 11/11; F16L 27/11; F16L 27/111; F01N 13/1816; F01N 13/18; F01N 2450/20; F01N 2470/06; F01N 2470/12; B21D 15/03; B21D 15/10
  USPC ............... 285/49, 226, 227, 299, 145.5, 903
  See application file for complete search history.

(56) References Cited

U.S. PATENT DOCUMENTS

| | | | | | |
|---|---|---|---|---|---|
| 2,773,538 | A | * | 12/1956 | De Mers | ........................ 285/226 |
| 8,690,195 | B2 | * | 4/2014 | Chahine | ................. F16L 27/11 |
| | | | | | 285/226 |
| 2001/0052253 | A1 | | 12/2001 | Okada et al. | |

FOREIGN PATENT DOCUMENTS

| | | | | |
|---|---|---|---|---|
| FR | 665555 | A | * 9/1929 | .............. F16L 27/11 |
| JP | 03-087815 | U | 9/1991 | |
| JP | 2002-005288 | A | 1/2002 | |
| JP | 2003-202088 | A | 7/2003 | |
| JP | 2005-95983 | A | 4/2005 | |
| KR | 10-0257915 | B1 | 6/2000 | |
| KR | 10-0584489 | B1 | 5/2006 | |
| KR | 10-2011-0119301 | A | 11/2011 | |
| KR | 10-2015-0132824 | A | 11/2015 | |

* cited by examiner

BELLOWS HAVING TWEEZERS-SHAPED CORRUGATED PORTIONS AND METHOD FOR MANUFACTURING SAME

TECHNICAL FIELD

The present invention relates to a bellows having tweezers-shaped corrugated portions and a method for manufacturing the bellows, and more particularly, to a bellows having tweezers-shaped corrugated portions for increasing resistance and restoring force against torsion, and a manufacturing method thereof.

BACKGROUND ART

Generally, as the output of an engine of a vehicle increases, great vibration caused by an engine roll at the time of engine start-up, rapid braking, gear shifting, and the like may be generated when starting the engine. In addition, the vibration may occur in an exhaust pipe depending on the condition of the road surface while driving.

Therefore, an exhaust pipe having a muffler is typically connected to the engine of the vehicle and an exhaust pipe connection device (decoupler) is installed at a connection portion between the engine and the exhaust pipe to absorb and damp vibration displacement, impact load, and thermal deformation.

In such an installation location, the exhaust pipe connection device requires to have a small size while supporting a small number of hanger mountings, as well as firmly supporting the entire exhaust pipe itself. The exhaust pipe connecting device is a decoupling element for absorbing vibration caused by a displacement of an engine roll or transmitted through an exhaust system from a road surface. The exhaust pipe connection device includes a bellows, in which an overall length (a total length) of a decoupler closes to 2D of the exhaust pipe, a ball joint and a decoupler, which are called short decoupling elements.

Meanwhile, as the regulation for exhaust gas of the vehicle is reinforced, a capacity of a post treatment apparatus for the exhaust gas increases, and it is difficult to secure a straight section for mounting a decoupling element in the exhaust system.

The usefulness of such short decoupling elements is increasing. However, when the problem of flexibility caused by a short length is incorporated with problems of noise, vibration, and hardness, the early failure due to joints and resonance may occur.

In addition, a short bellows used in a short decoupling element has no sufficient flexibility, so that an early crack of the bellows or a breakage of a joint part of the bellows may occur due to the low frequency resonance of the exhaust system.

Further, a welded diaphragm bellows is formed by alternately welding an inside and an outside of the diaphragms in a state in which the diaphragms overlap with each other. Thus, an early fatigue may occur due to the thermosetting of the welding part. In addition, since a thin plate having a thickness of 0.2 mm is welded, it is difficult to secure a consistent quality so that the manufacturing cost is increased. The welded diaphragm bellows may not be applied to the vehicle due to a problem of productivity.

Meanwhile, a formed diaphragm bellows is fabricated without welding. Different from a bellows fabricated by a welding scheme, the formed diaphragm bellows may not cause the early crack so that the diaphragms, which cannot be used before, can be used in the field of the vehicle requiring the mass-production.

In addition, most semiconductor manufacturing facilities requiring a vacuum environment are provided with a vacuum device for making a vacuum environment. The vacuum device mainly includes a vacuum pump, a vacuum line, and an exhaust line. One side of the vacuum line is connected to the semiconductor manufacturing facility requiring the vacuum environment, the other side of the vacuum line is connected to the vacuum pump, and the exhaust line is connected to one side of the vacuum pump.

The vacuum line of the vacuum device connects the vacuum pump with the semiconductor manufacturing facility which requires the vacuum environment. When the pipe lines of the semiconductor manufacturing facility are complicated or when there is a section requiring flexibility because the vacuum line of the vacuum device cannot be horizontally or vertically connected due to the installation positions of the semiconductor manufacturing facility and the vacuum device, a bellows having elasticity and flexibility is used instead of a pipe.

Flanges are coupled to both side ends of the bellows so that the bellows can be connected to exhaust lines, vacuum pumps and semiconductor process chambers through the flanges.

Examples of such techniques are disclosed in documents 1 and 2 below.

For example, as shown in FIG. 1, Patent Document 1 discloses a bellows device including a bellows tube 60 formed of a metal material and has a corrugated tube shape having a mountain and a valley, a pair of flanges 10 mounted on a vacuum line connection portion and coupled to both side ends of the pair of the bellows tube 60, an interlock hose 20 having both side ends inserted into the pair of flanges 10 in the bellows tube 60, insertion grooves formed in the pair of flanges 10 in the circumferential direction, respectively, and an insertion portion 45 of the interlock hose 20 inserted into the insertion grooves. In a state in which the insertion portion 45 is inserted into the insertion groove of the flange to prevent a welding portion from being corroded or cracked due to the exposure to corrosive exhaust gas, the flanges 10 and the interlock hose 20 are liner-welded at the outside of the flanges 10 which is the outside of an exhaust passage.

In addition, Patent Document 2 discloses a method of separating an elastic bellows portion from an injection mold, which includes the steps of: enclosing a core pin and a separating rod in a split cavity, and injection-molding an elastic bellows portion around the core pin and the separating rod, in which the core pin and the separating rod have vertical axes substantially coinciding with each other, and the elastic bellows portion has a substantially rigid first open end and an elastic second open end; opening the split cavity to separate the elastic bellows portion from the core pin; expanding the elastic bellows portion radially outward from the core pin; and expanding the elastic bellows portion outward from the core pin and pushing the substantially rigid first open end of the elastic bellows portion by using the separating rod to remove the elastic bellows portion from the core pin.

PATENT DOCUMENTS (Patent Document 1) Korean Unexamined Patent Publication No. 10-2015-0132824 (published on Nov. 26, 2015)

(Patent Document 2) Korean Registered Patent Publication No. 10-0257915 (registered on July of 2000)

DISCLOSURE

Technical Problem

However, according to the related arts as described above, the bellows is provided in the form of a spiral hose so that the cutting and assembling processes of the spiral hose are difficult and material loss occurs. That is, the spiral structure is not easy to cut, and it is difficult to maintain airtightness of a cutting section so that several corrugations overlap with each other to maintain the airtightness.

In addition, when the corrugation is welded according to the related art, there is a problem that the bellows function may be lost due to corrosion in a heat affected zone.

An object of the present invention is to provide a bellows having tweezers-shaped corrugated portions for increasing resistance and restoring force against torsion by increasing the number of corrugated portions (mountains), and a manufacturing method thereof.

Another object of the present invention is to provide a bellows having tweezers-shaped corrugated portions for facilitating cutting and assembling processes and a manufacturing method thereof.

Technical Solution

In order to achieve the above objects, there is provided a bellows including a first flat part having a flat cylindrical shape; a second flat part having a flat cylindrical shape and disposed opposite to the first flat part; and a plurality of corrugated portions, each having a tweezers shape and disposed between the first flat part and the second flat part, wherein the plurality of corrugated portions are sequentially connected to each other.

In the bellows according to the present invention, each corrugated portion may include: a protrusion portion having a first surface and a second surface successively provided next to the first surface in parallel, in which the first surface and the second surface are in close contact with each other, and a connecting portion of the first surface and the second surface protrudes in a circular shape; a convex portion having a third surface extending from the first surface and protruding outward in a convex shape and a fourth surface extending from the second surface and protruding outward in a convex shape; and a concave portion having a fifth surface extending from the third surface and recessed inward in a convex shape and a sixth surface extending from the fourth surface and recessed inward in a convex shape, wherein the corrugated portions may be connected to each other at the concave portion.

In the bellows according to the present invention, an interval between the third surface and the fourth surface may be greater than an interval between the fifth surface and the sixth surface.

In addition, in the bellows according to the present invention, the corrugated portions may be sequentially formed through a hydro-forming method.

In order to achieve the above objects, there is provided a method of manufacturing a bellows, the method including: (a) providing a base metal for forming the bellows around a head; (b) supporting the base metal with a support device and a movable device after holding the first flat surface with respect to the base metal; (c) applying pressure to the base metal provided between the support device and the movable device; (d) forming corrugated portions by moving the movable device toward the support device after the base metal is formed into a predetermined size, wherein the corrugated portions are sequentially formed through a hydro-forming method.

According to the method of manufacturing a bellows of the present invention, each corrugated portion may include: a protrusion portion having a first surface and a second surface successively provided next to the first surface in parallel, in which the first surface and the second surface are in close contact with each other, and a connecting portion of the first surface and the second surface protrudes in a circular shape; a convex portion having a third surface extending from the first surface and protruding outward in a convex shape and a fourth surface extending from the second surface and protruding outward in a convex shape; and a concave portion having a fifth surface extending from the third surface and recessed inward in a concave shape and a sixth surface extending from the fourth surface and recessed inward in a concave shape.

According to the method of manufacturing a bellows of the present invention, an inner peripheral portion of the support device may be formed in a shape corresponding to the first surface of the protruding portion of the corrugated portion, the third surface of the convex portion, and the fifth surface of the concave portion, and an inner peripheral portion of the movable device may be formed in a shape corresponding to the second surface of the protruding portion of the corrugated portion, the fourth surface of the convex portion and the sixth surface of the concave portion.

Advantageous Effects

As described above, according to the bellows having tweezers-shaped corrugated portions and the manufacturing method of the bellows of the present invention, resistance and restoring force against torsion can be increased by providing the tweezers-shaped corrugated portions.

Further, according to the bellows having tweezers-shaped corrugated portions and the manufacturing method of the bellows of the present invention, the flat portions and the corrugated portions are separately and sequentially formed through hydroforming so that, when the bellows is mounted on an apparatus such as an exhaust pipe, the assembling process can be simplified and the loss of the material can be prevented.

MODES OF THE INVENTION

These and other objects and novel features of the present invention will become more apparent from the description of the present invention and the accompanying drawings.

First, characteristics of a bellows having tweezers-shaped corrugated portions according to the present invention will be described.

A diaphragm bellows is more flexible than necessary so that, for example, a crack may be generated due to resonance during running of a vehicle. Therefore, according to the present invention, a half is made as a diaphragm bellows and the other half is made as a general bellows, thereby providing a bellows having tweezers-shaped corrugated portions capable of obtaining great restoring force.

Hereinafter, the configuration of the present invention will be described with reference to FIGS. 2 to 4.

Figure 1:
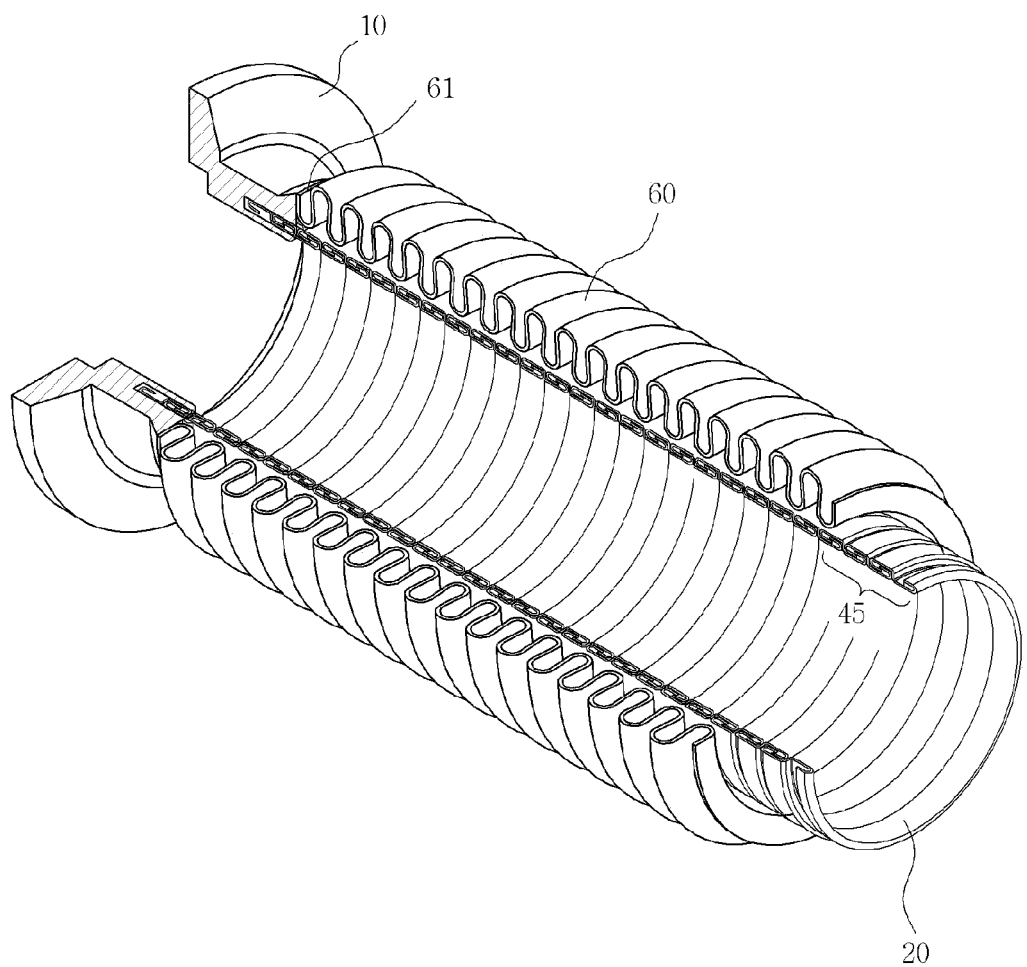
FIG. 1 is a perspective view showing a configuration of a conventional bellows device.
Figure 2:
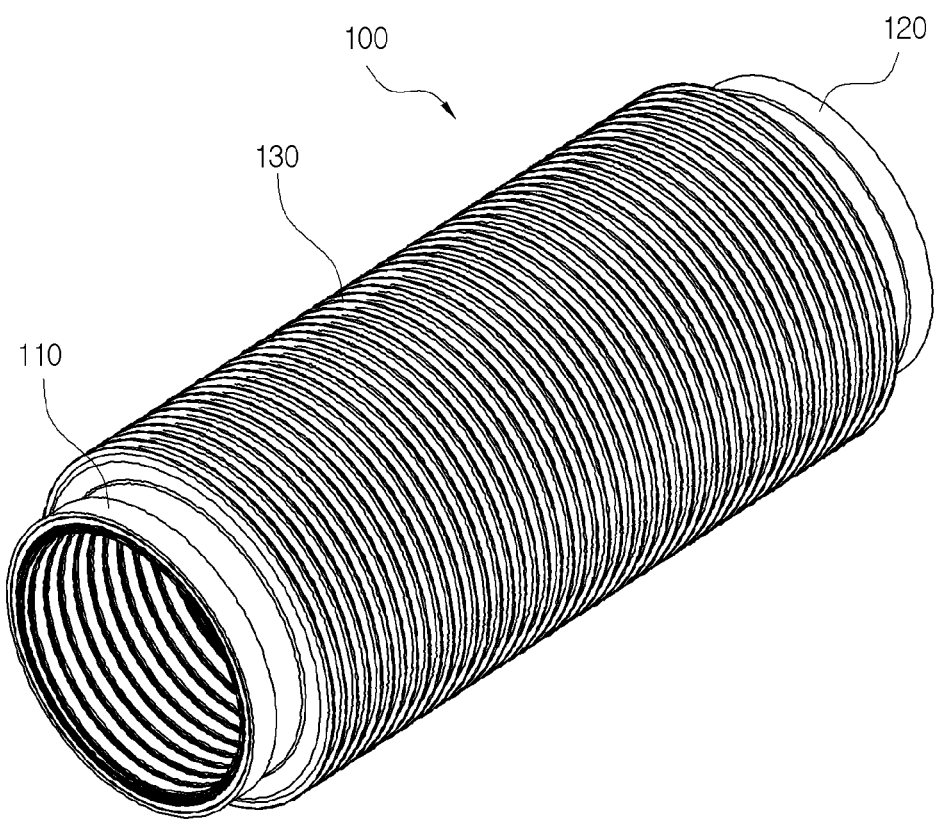
FIG. 2 is a perspective view of a bellows having tweezers-shaped corrugated portions according to the present invention.
Figure 3:
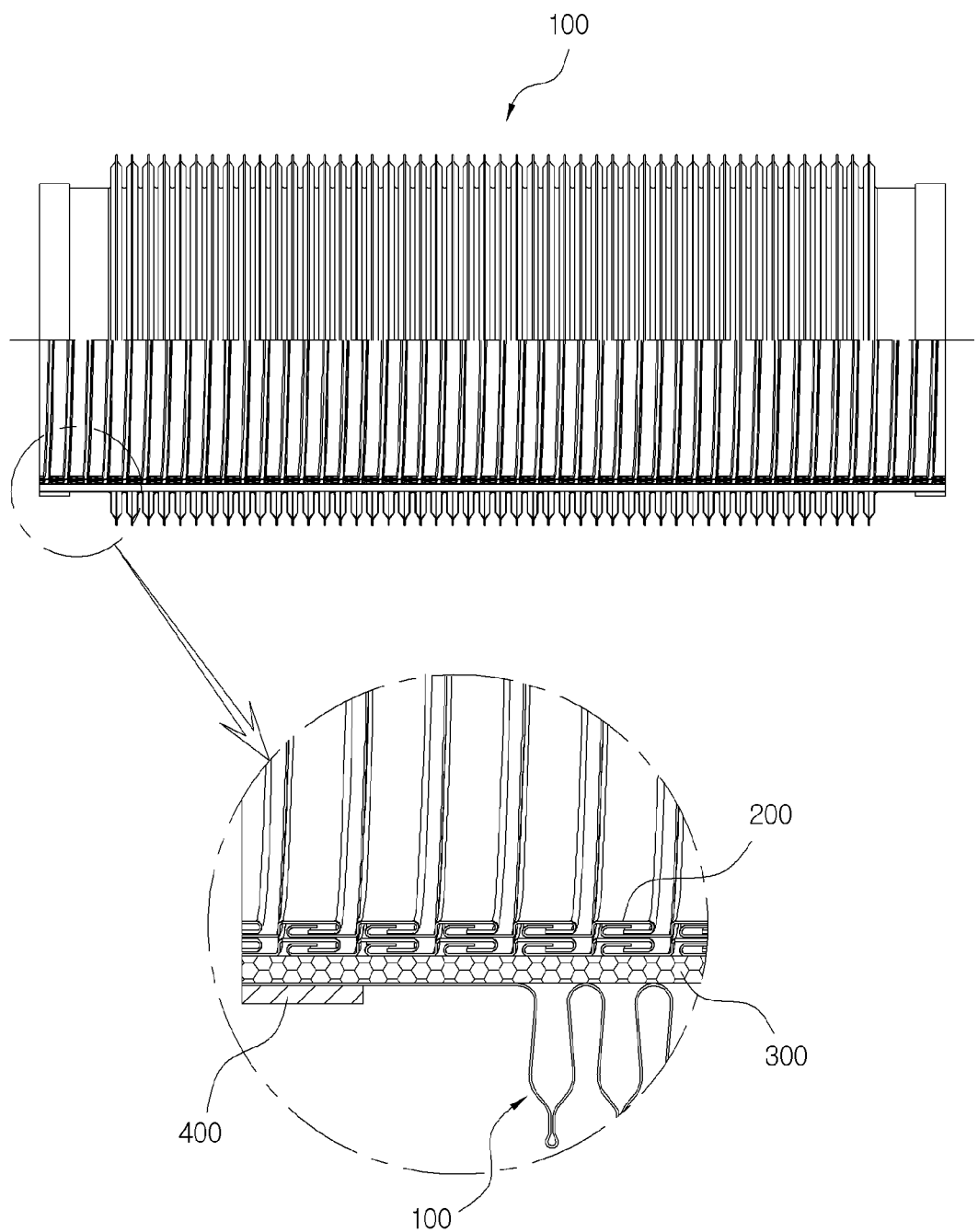
FIG. 3 is a view showing a state in which a double interlock hose is provided in the bellows of FIG. 2.
Figure 4:
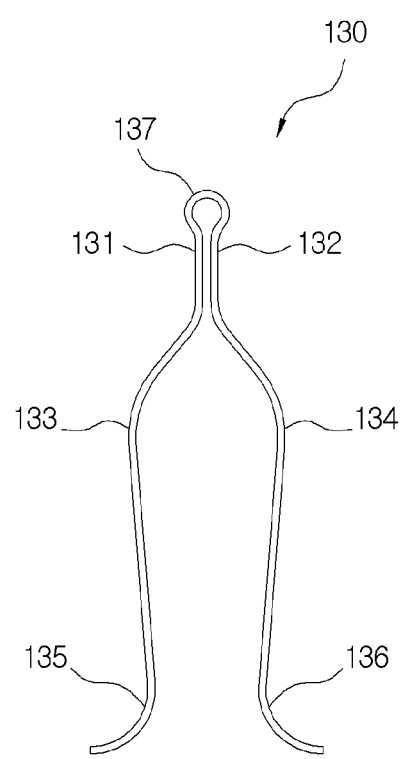
FIG. 4 is a view for explaining the configuration of the corrugated portion shown in FIG. 2.

FIG. 2 is a perspective view of a bellows having tweezers-shaped corrugated portions according to the present invention, FIG. 3 is a view showing a state in which a double interlock hose is provided in the bellows of FIG. 2, and FIG. 4 is a view for explaining the configuration of the corrugated portion shown in FIG. 2.

As shown in FIG. 2, the bellows 100 according to the present invention includes a first flat portion 110 formed in a flat cylindrical shape, a second flat portion 120 formed in a flat cylindrical shape and opposed to the first flat portion 110, and corrugated portions 130 formed between the first flat portion 110 and the second flat portion 120 and having a tweezers shape.

For example, the bellows 100 according to the present invention may be used for vacuum line connection between components of an exhaust pipe connection device for commercial vehicles or components of a semiconductor manufacturing facility. In order to improve mobility of exhaust gas, as shown in FIGS. 2 and 3, a plurality of corrugated portions 130 are sequentially connected to each other to form a corrugated tube having elasticity. That is, the corrugated portions 130 according to the present invention are sequentially formed by a hydro-forming method.

Since the first flat portion 110, for example, can be inserted into a flange to be mounted on an inlet portion of the exhaust gas and the second flat portion 120 can be inserted into a flange to be mounted on an outlet portion of the exhaust gas, the problem that occurs during the cutting and assembling processes in the bellows provided with continuous corrugated portions defined by a spiral hose may be prevented and the bellows can be simply assembled. In addition, since the first flat portion 110 and the second flat portion 120 have no corrugated portions, it is possible to prevent the loss of a base metal, for example stainless steel, as compared with the conventional bellows.

For example, as shown in FIG. 3, a double interlock hose 300 is provided in the bellows 100 according to the present invention, a wire mesh 300 is provided between the bellows 100 and the double interlock hose 300 to attenuate impact caused by contact between bellows 100 and the double interlock hose 300, and the bellows 100, the double interlock hose 200 and the wire mesh 300 are fixed by a coupling ring 400.

As shown in FIG. 4, the corrugated portion 130 formed in the bellows 100 according to the present invention includes a protrusion portion having a first surface 131 and a second surface 132 successively provided next to the first surface 131 in parallel, in which the first surface 131 and the second surface 132 are in close contact with each other, and a connecting portion of the first surface 131 and the second surface 132 protrudes in a circular shape 137; a convex portion having a third surface 133 extending from the first surface 131 and protruding outward in a convex shape and a fourth surface 134 extending from the second surface and protruding outward in a convex shape; and a concave portion having a fifth surface 135 extending from the third surface 133 and recessed inward in a concave shape and a sixth surface 136 extending from the fourth surface 134 and recessed inward in a concave shape.

The corrugated portion 130 has a function of a corrugated tube of the bellows 100 by connecting the fifth surface 135 of one concave portion and the sixth surface 136 of another concave portion adjacent to the one concave portion.

As shown in FIG. 4, in the corrugated portion 130 according to the present invention, an interval between the third surface 133 and the fourth surface of the convex portion is larger than an interval between the fifth surface 135 and the sixth surface 136 of the concave portion so that the corrugated portion 130 may have a shape of a tweezer.

That is, as shown in FIG. 4, since the corrugated portion 130 according to the present invention has a tweezer shape, for example, when the concave portion is subject to an impact caused by sudden discharge of the exhaust gas or an external impact applied to the vehicle, the strength of the corrugated portion 130 may increase due to the supporting force of the protruding portion and the restoring force of the convex portion, thereby preventing the corrugated portion 130 from being damaged even when the impact applied to the bellows 100 is excessive.

In addition, as shown in FIG. 4, since the connecting portion of the protruding portion, which is formed between the first surface 131 and the second surface 132, has the circular shape 137, an edge portion can be prevented from being broken by the impact applied to the corrugated portion 130 of the bellows 100.

Next, the process of forming the corrugated portion 130 as shown in FIG. 4 will be described with reference to FIGS. 5a to 5c.

Figure 5A:
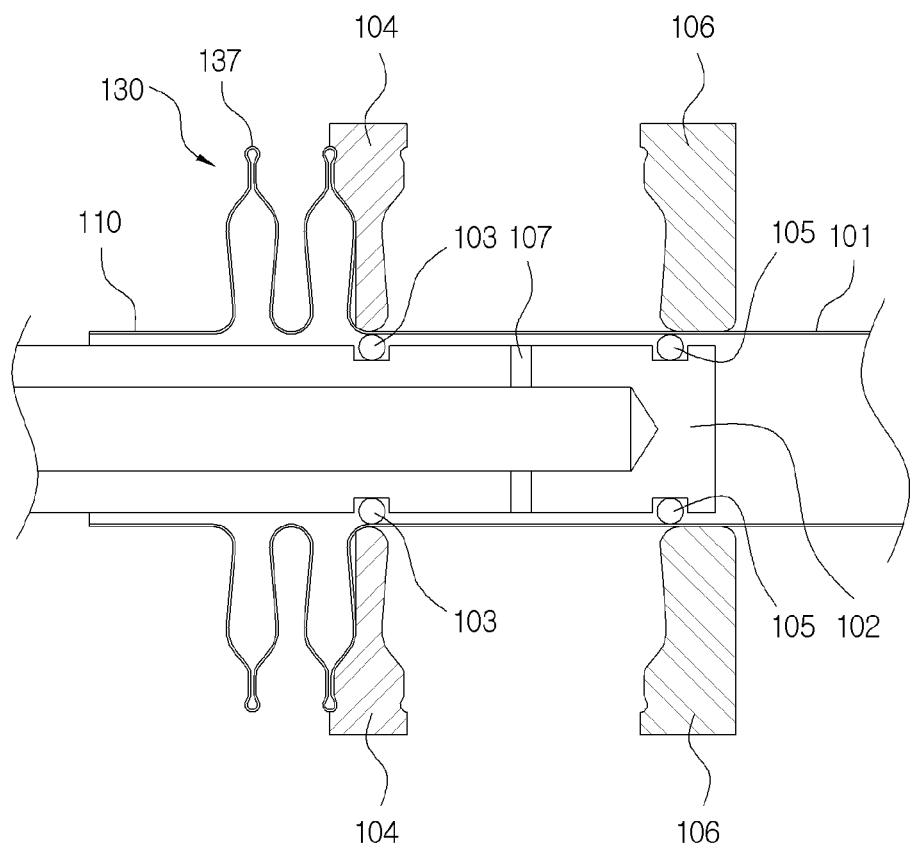
FIGS. 5*a* to 5*c* are views for explaining a manufacturing process of the bellows according to the present invention.
Figure 5B:
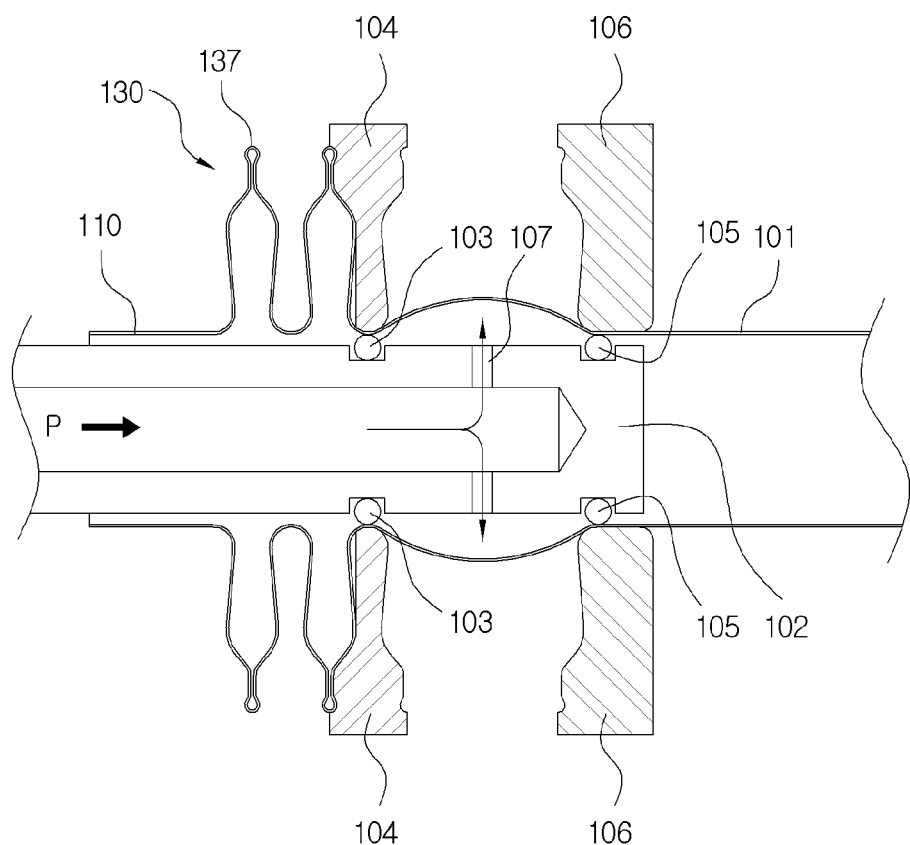
Figure 5C:
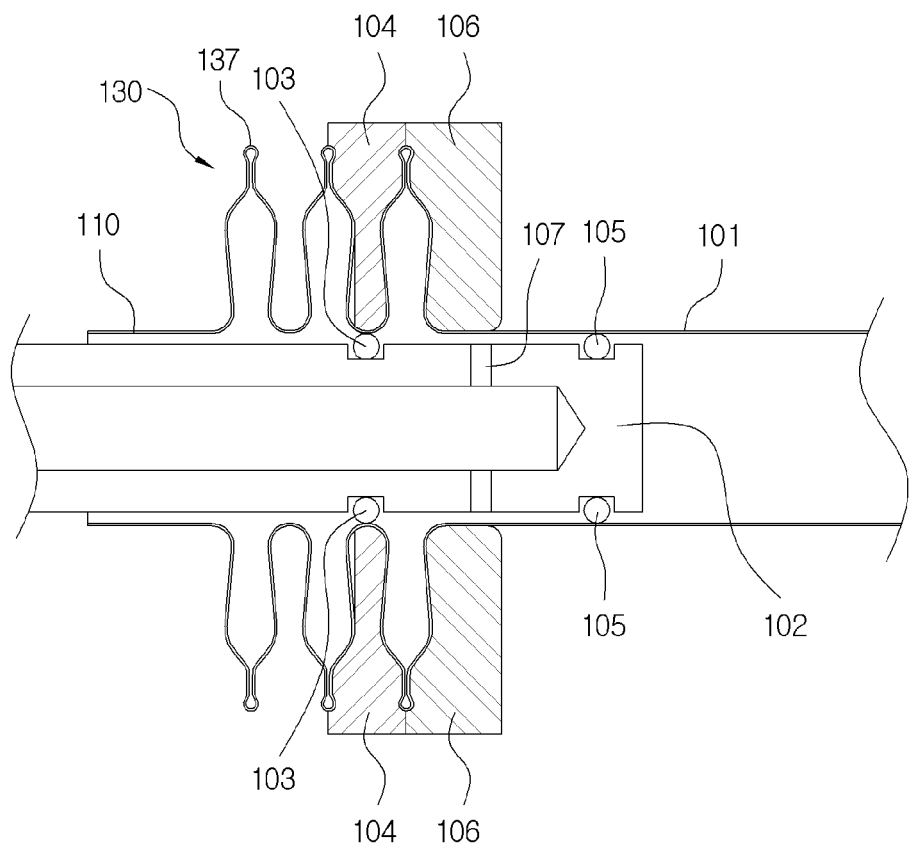

FIGS. 5a-5c are views for explaining a manufacturing process of the bellows according to the present invention, in which FIG. 5a shows the state where the base metal is in a flat state, FIG. 5b shows the state where pressure is applied the base metal by hydroforming, and FIG. 5c shows the state where the base metal is moved by a movable device.

As shown in FIG. 5a, in order to manufacture the bellows 100 according to the present invention, the base metal 101 formed in a cylindrical shape is supplied along an outer circumference of a cylindrical head 102. The base metal may include, for example, stainless steel, but is not limited thereto. Various materials can be used as the base metal if the hydroforming can be applied to the materials and a mounting target of the bellows. An inner diameter of the cylindrical base metal 101 is, for example, φ103.7 that satisfies the standard of an exhaust pipe of a commercial vehicle, but is not limited thereto. The inner diameter of the base metal 101 may be increased or decreased corresponding to an outer diameter of an exhaust pipe of an apparatus to which the bellows is mounted.

As shown in FIG. 5a, the corrugated tube 130 according to the present invention may be formed after maintaining a length corresponding to a portion of the cylindrical first flat portion 110, for example, a length (23 mm) of the first flat portion 110. To this end, a first support ring 103 and a second support ring 105, which have cylindrical shapes, are fitted around the outer peripheral portion of the head 102 at an interval corresponding to a length suitable for forming the corrugated portion 130 through the hydroforming and a support device 104 and a movable device 106 are mounted on the first support ring 103 and the second support ring 105, respectively. The support device 104 includes a first support device and a second support device in the form of semicircular arcs each of which can move up and down in a state shown in FIG. 5a, and comes into contact with the first support ring 103 with respect to the base metal 101, thereby preventing the movement of the base metal 101. The movable device 106 comes into contact with the second support ring 105 in a state shown in FIG. 5a to prevent the movement of the base metal 101. The movable device 106 can move to the left after the hydroforming is performed on the base metal 101, and can move to the right after the corrugated portion 130 has been formed.

As shown in FIGS. 5a-5e, an outer peripheral side of the support device 104 is formed as a flat surface such that the support device 104 can be withdrawn by vertically moving up and down between the preformed corrugated portions 130, and an inner circumferential side of the support device 104 has a shape corresponding to the first surface 131 of the protruding portion, the third surface 133 of the convex portion, and the fifth surface 135 of the concave portion of the corrugated portion shown in FIG. 4. In addition, an inner peripheral side of the movable device 106 has a shape corresponding to the second surface 132 of the protruding portion, the fourth surface 134 of the convex portion, and the sixth surface 136 of the concave portion of the corrugated portion 130 shown in FIG. 4, and an outer peripheral side of the movable device 106 has a movable structure and is not limited to a particular shape.

Further, the head 102 is formed with a pressure supply hole 107 for applying predetermined pressure, such as pneumatic pressure or hydraulic pressure, to the base metal 101 when the hydroforming is performed.

When manufacturing the bellows 100 according to the present invention, the base metal 101 is kept in a state shown in FIG. 5a, that is, the base metal 101 is kept in a flat state between the first support ring 103 and the second support ring 105, and a gap between the head 102 and the base metal 101 is sealed by the support device 104 and the movable device 106.

In this state, as shown in FIG. 5b, when the predetermined pressure (arrow direction) is applied to the pressure supply hole 107 of the head 102, the forming of the base metal 101 is generated in the outer circumferential direction of the head 102 due to the applied pressure. That is, the hydroforming is performed with respect to the base metal 101. The hydroforming is performed to the extent that the corrugated portions 130 can be formed only in forming portions formed when the movable device 106 moves to the left.

Next, in the state shown in FIG. 5b, the movable device 106 moves to the left to maintain the state shown in FIG. 5c for a predetermined time.

The movement of the base metal 101, the pressurization through the head 102, the up/down movement of the support device 104, and the left/right movement of the movable device 106 are automatically performed according to preset shape information and material information of the bellows. In addition, the holding time of the state shown in FIG. 5c is defined according to the metallic property of the base metal 101, and is not particularly limited to the specific time.

After one corrugated portion 130 has been formed as shown in FIG. 5c, the first support device and the second support device respectively move up and down from the state shown in FIG. 5c, the base metal 101 is supplied by a predetermined length and the movable device 106 moves to the right. Then, the first support device and the second support device move up and down to come into contact with the first support ring 103, and the movable device 106 comes into contact with the second support ring 105 as shown in FIG. 5a. After that, as described above, the states shown in FIGS. 5b and 5c are progressed so that the corrugated portions 130 can be formed sequentially.

That is, different from the conventional bellows which is formed continuously, the corrugated portions 130 according to the present invention are formed sequentially.

After forming a predetermined number of corrugated portions corresponding to the mounting target of the bellows according to the present invention, the base metal 101 is simply supplied to form the second flat portion 120, thereby forming the bellows according to the present invention as shown in FIG. 2.

According to the present invention, after forming a predetermined number of the corrugated portions 130, the base metal 101 is simply supplied corresponding to the lengths of the second flat portion 120 and the first flat portion 110 to sequentially form the corrugated portions so that a plurality of bellows can be continuously produced. Accordingly, the bellows having the first flat portion 110, the corrugated portion 130, and the second flat portion 120 can be easily manufactured by simply cutting a portion between the second flat portion 120 and the first flat portion 110.

Although the present invention has been described in detail with reference to the above embodiments, the present invention is not limited to the above-described embodiments, and various modifications may be made without departing from the scope of the present invention.

INDUSTRIAL APPLICABILITY

According to the bellows having tweezers-shaped corrugated portions and the method for manufacturing the bellows, resistance and restoring force against torsion applied to the corrugated portions can be increased.

The invention claimed is:
1. A bellows comprising:
a first flat part having a flat cylindrical shape;
a second flat part having a flat cylindrical shape and disposed opposite to the first flat part; and
a plurality of corrugated portions disposed between the first flat part and the second flat part,
wherein the plurality of corrugated portions are sequentially connected to each other,
wherein each of the plurality of corrugated portions includes:
a protrusion portion having a first surface and a second surface disposed opposite to the first surface in parallel, in which the first surface and the second surface are adjacent to each other, and a connecting portion connecting the first surface with the second surface, wherein the connecting portion has a circular shaped head including a first circumference continuously connected with the first surface and a second circumference continuously connected with the second surface, the first circumference protruding outwardly from the first surface in a direction perpendicular to an extending direction of the first surface, and the second circumference protruding outwardly from the second surface in a direction perpendicular to an extending direction of the second surface;
a convex portion having a third surface extending from the first surface and protruding outward in a convex shape and a fourth surface extending from the second surface and protruding outward in a convex shape; and
a concave portion having a fifth surface extending from the third surface and recessed inward from the third surface in a concave shape and a sixth surface extending from the fourth surface and recessed inward from the fourth surface in a concave shape, and wherein a shape of each of the plurality of corrugated portions is symmetrical on both sides with respect to a central line extending from a center of the connecting portion, and the plurality of corrugated portions are connected to each other at the respective concave portion, such that the plurality of corrugated portions are prevented from being damaged when external impact is applied thereto due to supporting force of the protrusion portion and restoring force of the convex portion.

2. The bellows of claim 1, wherein an interval between the third surface and the fourth surface is greater than an interval between the fifth surface and the sixth surface.

3. The bellows of claim 1, wherein the plurality of corrugated portions are sequentially formed through a hydro-forming method.

4. A method for manufacturing a bellows, the method comprising:
(a) providing a base metal for forming the bellows around a head;
(b) supporting the base metal with a support device and a movable device after holding a flat surface with respect to the base metal;
(c) applying pressure to the base metal provided between the support device and the movable device;
(d) forming a plurality of corrugated portions by moving the movable device toward the support device after the base metal is formed into a predetermined size,
wherein the plurality of corrugated portions are sequentially formed through a hydro-forming method,
wherein each of the plurality of corrugated portions includes:
a protrusion portion having a first surface and a second surface disposed opposite to the first surface in parallel, in which the first surface and the second surface are adjacent to each other, and a connecting portion connecting the first surface with the second surface, wherein the connecting portion has a circular shaped head including a first circumference continuously connected with the first surface and a second circumference continuously connected with the second surface, the first circumference protruding outwardly from the first surface in a direction perpendicular to an extending direction of the first surface, and the second circumference protruding outwardly from the second surface in a direction perpendicular to an extending direction of the second surface;
a convex portion having a third surface extending from the first surface and protruding outward in a convex shape and a fourth surface extending from the second surface and protruding outward in a convex shape; and
a concave portion having a fifth surface extending from the third surface and recessed inward from the third surface in a concave shape and a sixth surface extending from the fourth surface and recessed inward from the fourth surface in a concave shape, and wherein a shape of each of the plurality of corrugated portions is symmetrical on both sides with respect to a central line extending from a center of the connecting portion, and the plurality of corrugated portions are connected to each other at the respective concave portion, such that the plurality of corrugated portions are prevented from being damaged when external impact is applied thereto due to supporting force of the protrusion portion and restoring force of the convex portion.

5. The method of claim 4, wherein an inner peripheral portion of the support device is formed in a shape corresponding to the first surface of the protrusion portion, the third surface of the convex portion, and the fifth surface of the concave portion, and an inner peripheral portion of the movable device is formed in a shape corresponding to the second surface of the protrusion portion, the fourth surface of the convex portion and the sixth surface of the concave portion.

\* \* \* \* \*